H. L. MAINLAND.
ANIMAL TRAP.
APPLICATION FILED DEC. 22, 1910.
1,004,448.
Patented Sept. 26, 1911.
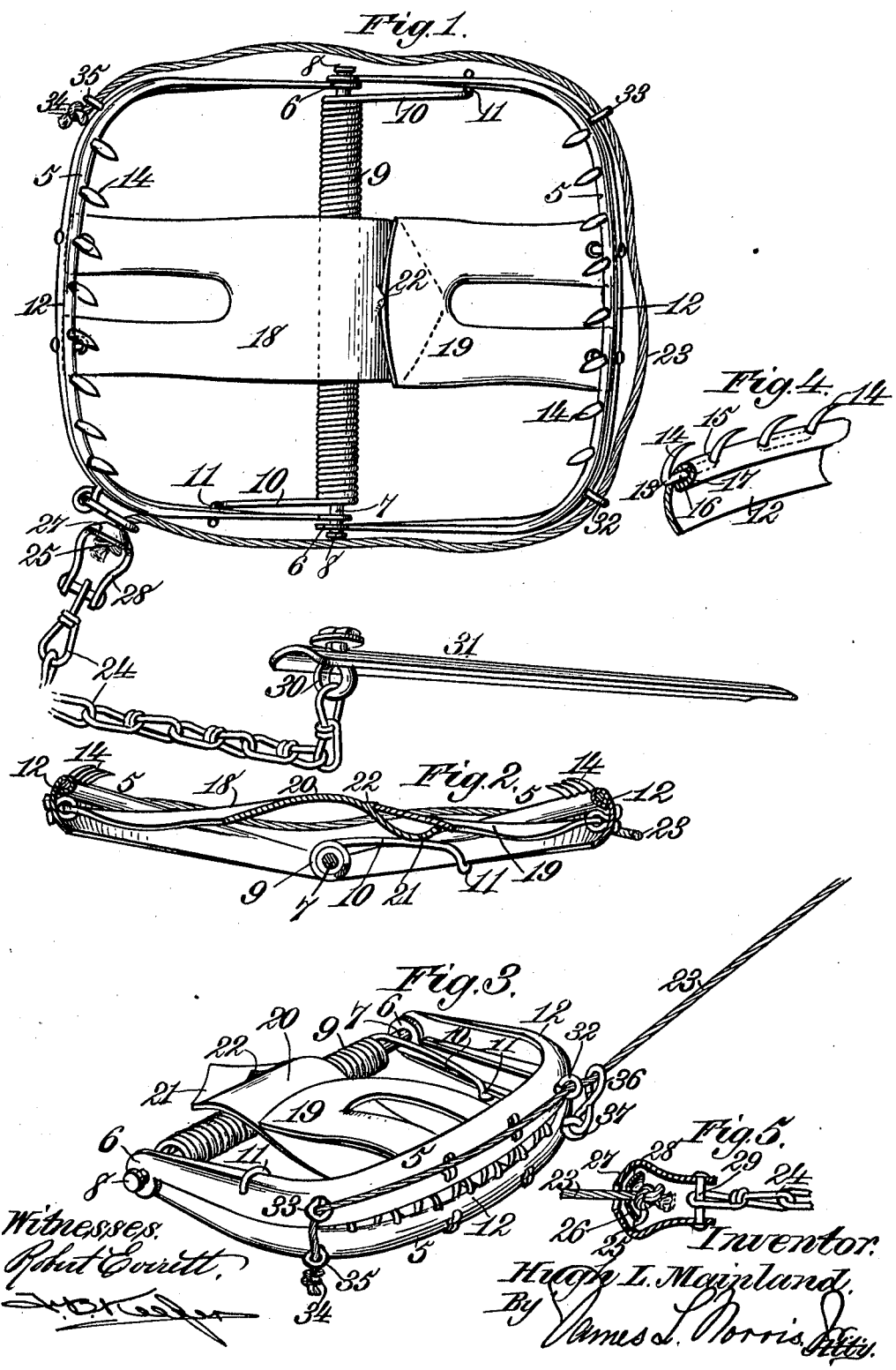

UNITED STATES PATENT OFFICE.

HUGH L. MAINLAND, OF BURKES, NEAR DUNEDIN, NEW ZEALAND.

ANIMAL-TRAP.

1,004,448.   Specification of Letters Patent.   Patented Sept. 26, 1911.

Application filed December 22, 1910. Serial No. 598,858.

*To all whom it may concern:*

Be it known that I, HUGH L. MAINLAND, a subject of the King of Great Britain, residing at Burkes, near Dunedin, New Zealand, have invented new and useful Improvements in Animal-Traps, of which the following is a specification.

This invention relates to animal traps and particularly to devices of this class embodying a pair of spring-actuated jaws provided with means for setting the jaws open, the said means being releasable by pressure exerted thereon, as for instance through the medium of the foot of an animal passing over the trap.

The trap is an improvement on that disclosed by my Letters Patent No. 887,675, dated May 12, 1908, and the features of improvement consist mainly in the manner of applying teeth to the jaws, the association with the jaws of a tether cord or analogous device, and the application of a spring to the pivot means of the jaws in such manner that the tension of the spring may be readily tightened when necessary without dissociating the parts of the trap or separating the spring from the pivot means.

The invention also consists in the details of construction and arrangement of the several parts which will be more fully hereinafter described and claimed.

The primary object of the invention is to produce a trap that has an effective holding power without undue maiming of the animal caught, and to structurally strengthen traps and provide for a regulation or adjustment of the spring tension of the jaws and an alteration of the springing platform relatively to its releasing action by more or less weight imposed thereon.

In the drawing: Figure 1 is a plan view of the improved trap shown open. Fig. 2 is a cross-section of the open trap. Fig. 3 is a perspective view of the trap shown closed. Fig. 4 is a detail perspective view of a portion of the trap showing the manner of securing the teeth therein. Fig. 5 is a detail section of a portion of the tether cord or analogous device and illustrating a swivel connection to prevent parts of the tether from becoming tangled or twisted.

The numeral 5 designates the jaws of the trap which are preferably of substantial U-shape and have the terminals of their legs provided with eyes 6 which are assembled in close relation and movably connected by a pivot or pintle rod 7 which is secured at its opposite ends as at 8. Loosely mounted on the rod 7 is a coiled spring 9 having the coils thereof closely disposed relatively to each other and providing a spring cylinder or tube having an inner diameter materially greater than the diameter of the rod 7, as clearly shown by Fig. 2, so that the said rod is free to act as a pivot means for the jaws without interference by the spring and the latter is unrestricted in performing its function and is also free to be tightened or wound while in place on the rod 7. The opposite extremities of the spring 9 have legs 10 continuing therefrom in opposite directions, there being one leg at each extremity of the spring terminating in a hook or bend 11 to removably engage the outer edge portion of one of the legs of the nearest jaw, the legs 10 of the spring terminally engaging similar portions of the opposing jaws so that when the trap is released the jaws will be forcefully closed. At any time found desirable or necessary the tension of the spring 9 may be modified by releasing the terminals of the legs 10 from the jaws and winding or unwinding the spring by rotating the said legs 10 around the pintle or pivot rod 7 to tighten or slacken the spring. This modification of the tension of the spring may be readily effected without releasing any permanent fastening means or dissociating any of the parts of the trap. The adjustment of the spring 9 as just explained is a very convenient as well as desirable feature, as the jaws 5 can always be maintained under the spring stress necessary to render them effective in performing their trapping function.

The biting or clamping bars 12 of the jaws are channeled, as shown by Fig. 2, and carry teeth at their inner edges, the said teeth consisting of staples 13 having their legs 14 projected through openings 15 formed in the inner edges of the jaws and having their connecting bars 16 positively held within a seat 17 formed by bending the edge portions of the jaws inwardly, as shown by Fig. 4, and by this means each pair of teeth is positively united and held in fixed position by a simple method of application and may be replaced in the event of breakage. The legs 14 of each staple are pointed or sharpened and bent inwardly and laterally toward the side of the trap adjacent to its anchorage, the teeth of the two jaws having an inward trend in reverse directions and the sets of teeth of the two jaws being so disposed that the one set will move or be projected between the spaces between the remaining set when the jaws are closed, as illustrated by Fig. 3. It is obvious that the inward bend of the teeth will be exceptionally effective in holding the caught animal against release from the jaws when the latter are closed.

The trip and setting devices for the trap are very simple and are substantially the same as those disclosed by my patent hereinbefore mentioned. The trip and setting devices embody two plates 18 and 19, the plate 18 being secured at its outer extremity to one of the jaws to have free movement, and the plate 19 similarly connected to the opposite jaw. The plate 18 has a bow 20 adjacent to its free extremity and a terminal bend 21 in reverse direction to the said bow and on its upper side between the bow 20 and the reversely bent extremity 21 the plate 18 is provided with a projection 22 for separable engagement by the free inner end of the plate 19, as shown by Fig. 2, the inner free extremity of the plate 19 being disposed over the bend 21. The bent extremity 21 of the plate 18 can be bent more or less to allow the trap to be sprung with more or less weight on the platform formed by the associated plates, and by giving said extremity a curvature reverse to the bow 20, or by bending this extremity away from the inner extremity of the plate 19 which it engages, allowance for dirt which often gets between the plates is made. By loosely attaching the outer extremities of the plates 18 and 19 to the jaws they may be more readily set to hold the jaws open and when released they assume positions which will not in the least interfere with the operation of the jaws in the closing movement of the latter.

A tether device is secured to the trap, and in the present instance partially consists of a cord or small wire cable 23 and a chain 24, the cord or cable 23 having a knot 25 at one end and a cup washer 26 thereon to engage the knot and also a cupped seat 27 formed at one end of a coupling yoke 28 and through which the said cord or cable 23 loosely passes, as shown by Fig. 5. The chain 24 is terminally attached to a connecting pin 29 for the legs of the yoke 28, and at its opposite terminal the said chain is attached to a swivel 30 disposed in one extremity of an anchor pin or stake 31, preferably formed from a piece of concavo-convex metal of suitable dimensions and adapted to be driven in the ground or into any other holding means adjacent to the point at which the trap is set. By using the swivel attachment 30, applied as shown by Fig. 1, the formation of a ring or eye at the upper end of the anchor pin or stake 31 is obviated and breakage of the connecting means for the chain 24 to the said pin or stake is less liable to occur. As shown by Fig. 3, the cord or cable 23 is loosely passed through eyes 32 and 33 on the one jaw 5 and has a knotted end 34 engaging an eye 35 on the opposite jaw and also passed through the eye at one end of a link 36 which has the remaining eye thereof loosely connected to an eye 37 on the jaw carrying the eye 35. The eyes 32 and 33 are individually located adjacent to opposite sides of the jaw to which they are attached and the eyes 35 and 37 are similarly positioned on the remaining jaw, and hence when the jaws are closed on the leg of an animal the tugging strain on the trap incident to an effort on the part of the animal to release his trapped leg will cause the cord or cable 23 to be drawn taut and effect a tension on the opposite jaws adjacent to the sides of the latter and prevent the jaws from opening, no matter what strain may be imposed thereon. All of the eyes 32, 33, 35 and 37 are movably connected to the jaws so as to have a self-adjustment relatively to the varying positions of the cord or cable 23. By this means the tether cord or cable 23 serves as a very effective auxiliary to the spring 9 in maintaining the jaws in closed position and in engagement with the leg of a trapped animal and all efforts of the animal that might tend to overcome the tension of the spring and open the jaws will be defeated by the application of the tether cord or cable as just explained, and the stronger the effort of the animal to release himself the greater the resistance to the opening movement of the jaws.

From the foregoing the operation of the trap will be readily understood. When the jaws are pressed apart against the resistance of the spring 9 the plates 18 and 19 are brought into locking engagement, as shown by Figs. 1 and 2, and the cord or cable 23 passes around the jaws as shown by Fig. 1, the cord or cable automatically assuming this position when the jaws are opened. After the trap is set, as shown by Figs. 1 and 2, it is suitably covered to hide the same and the animal in passing thereover releases the trap by weight pressure on the plates, as for instance on the bow 20 of the plate 18, the downward pressure of the one plate releasing the engagement of the two plates and permitting the spring 9 to perform its function. It will be understood that when the jaws are opened their movement is against the resistance set up by the spring 9 and the tension of the latter is increased relatively to a normal tension by uniformly pressing the two legs 10 downwardly, as will be readily understood.

It is proposed to form the trap of suitable metal and to modify the proportions and dimensions thereof at will as well as the details of construction within the scope of the claims.

What is claimed as new is:

1. In an animal trap, the combination of opposed jaws provided with closing means, a tether engaging the trap, anchorage means for the tether, and teeth secured in distinct pairs in the inner edge of each jaw and bent inwardly and laterally toward the anchorage for the tether to cause the teeth to more firmly engage the leg of the trapped animal when the latter endeavors to release the leg from the jaws.

2. In a trap, the combination of jaws of concavo-convex form in cross section with the concave sides innermost, teeth consisting of staples with inwardly curved and terminally pointed legs inserted through the inner portions of the jaws adjacent to and along one edge of each jaw and having said inner edge portions fully bent over between and inclosing the heads of the staples, the remaining portions of the jaws from the inner bent edges outwardly to the outer edges remaining in original form, and inwardly extending plates pivotally attached to the jaws between the bent over edge portion and the opposite remaining edge portion of each jaw for holding both jaws in open condition and permitting the jaws to automatically close when released.

3. In a trap, the combination with jaws, of eyes loosely attached to the jaws adjacent to the points where the legs continue into the gripping bars of the jaws, and a tether terminally connected to one eye of one jaw and loosely threaded through the eyes of the remaining jaw and movably connected to the remaining eye of the first mentioned jaw to serve as an auxiliary means in maintaining the jaws closed when pulling tension is exerted on the trap by the efforts of a trapped animal to effect a release.

4. In a trap, the combination of jaws having closing means, a tether loosely held in connection with the opposite portions of the gripping bar of each jaw and engaged by means adjacent to the points of continuance of the gripping bar into the legs of the jaws, and means for automatically closing the jaws when released, the tether operating to lock the jaws closed by a pulling strain exerted on the tether, the tether operating equally adjacent to both legs of each jaw.

5. In a trap, the combination with jaws, of a tether connected to two portions of each of the gripping bars of the jaws at opposite sides and provided with a swivel connecting the parts thereof to prevent the tether from becoming twisted and to cause it to readily assume a position conforming to the position of the trap, and an elongated anchor pin adapted to be driven into the ground and to which the outer end of the tether is swiveled below the upper driving terminal of the pin.

In testimony whereof I have hereunto set my hand in presence of two subscribing witnesses.

HUGH L. MAINLAND.

Witnesses:
CHAS. A. ROWE,
F. B. KEEFER.

---

Copies of this patent may be obtained for five cents each, by addressing the "Commissioner of Patents, Washington, D. C."